US011588809B2

(12) United States Patent
Brito et al.

(10) Patent No.: US 11,588,809 B2
(45) Date of Patent: Feb. 21, 2023

(54) SYSTEM AND METHOD FOR SECURING A CONTENT CREATION DEVICE CONNECTED TO A CLOUD SERVICE

(71) Applicant: Palo Alto Research Center Incorporated, Palo Alto, CA (US)

(72) Inventors: Alejandro E. Brito, Mountain View, CA (US); Eric A. Bier, Palo Alto, CA (US); Marc E. Mosko, Santa Cruz, CA (US); Shantanu Rane, Menlo Park, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 167 days.

(21) Appl. No.: 17/016,689

(22) Filed: Sep. 10, 2020

(65) Prior Publication Data
US 2022/0078181 A1   Mar. 10, 2022

(51) Int. Cl.
*H04L 9/40* (2022.01)
(52) U.S. Cl.
CPC ...... *H04L 63/0823* (2013.01); *H04L 63/0428* (2013.01); *H04L 63/061* (2013.01); *H04L 63/20* (2013.01)
(58) Field of Classification Search
CPC ............ H04L 63/0823; H04L 63/0428; H04L 63/061; H04L 63/20; H04L 9/006; H04L 9/3263; H04L 9/0838; G06F 21/33
See application file for complete search history.

(56) References Cited

U.S. PATENT DOCUMENTS

| | | | |
|---|---|---|---|
| 6,751,732 B2 | 6/2004 | Strobel et al. | |
| 6,975,419 B2 | 12/2005 | Staas et al. | |
| 8,094,810 B2 | 1/2012 | Hohenberger et al. | |
| 8,370,907 B1* | 2/2013 | Potter | G06F 21/313 |
| | | | 725/108 |
| 8,630,008 B2 | 1/2014 | Burke, Jr. | |
| 8,810,821 B2 | 8/2014 | Burke, Jr. | |

(Continued)

OTHER PUBLICATIONS

Yuki Tsuchitoi et al., "10 MLOC in Your Office Copier," IEEE, 2011, pp. 93-95 (Year: 2011).*

(Continued)

*Primary Examiner* — Luu T Pham
*Assistant Examiner* — Canh Le
(74) *Attorney, Agent, or Firm* — Mueting Raasch Group (57) ABSTRACT

A certified application is installed onto a content creation device and a mobile certified application is installed onto a mobile device, the applications establish first and second trust relationships with the cloud service. The certified application and mobile certified application establish the third trust relationship via a proximity network. The mobile certified application generates a first ephemeral key pair having a private part. The certified application generates a second ephemeral key pair having a private part. The mobile certified application requests a service from the content creation device involving the transfer of data between the content creation device and the cloud service. The data is protected by at least one of the first and second ephemeral key pairs in response to invocation of the service. The service results in the data being stored at the cloud service and/or rendered at the content creation device.

21 Claims, 6 Drawing Sheets

(56) References Cited

U.S. PATENT DOCUMENTS

| | | |
|---|---|---|
| 9,329,810 B2 | 5/2016 | Shustef |
| 9,456,123 B2 | 9/2016 | Emmett et al. |
| 9,530,017 B2 | 12/2016 | Fallon et al. |
| 9,552,232 B2 | 1/2017 | Mukherjee et al. |
| 10,423,798 B2 | 9/2019 | Claiborne et al. |
| 10,573,106 B1 * | 2/2020 | Brady ................ G06V 40/1365 |
| 2006/0010323 A1 | 1/2006 | Martin et al. |
| 2011/0085196 A1 * | 4/2011 | Liu ....................... G06F 3/1204 |
| | | 358/1.15 |
| 2014/0070002 A1 | 3/2014 | Pineau et al. |
| 2014/0189351 A1 * | 7/2014 | Steely .................. H04L 9/0861 |
| | | 713/168 |
| 2015/0378656 A1 * | 12/2015 | Kessler ................ G06F 21/608 |
| | | 358/1.13 |
| 2016/0092871 A1 * | 3/2016 | Gordon ............. G06Q 20/3221 |
| | | 705/44 |
| 2016/0255056 A1 * | 9/2016 | Shalunov ........... H04L 63/0428 |
| | | 713/168 |
| 2016/0275907 A1 * | 9/2016 | Scott ...................... G06F 21/71 |
| 2017/0085751 A1 * | 3/2017 | Kakutani ............. H04N 1/4433 |
| 2019/0020633 A1 * | 1/2019 | Leavy ..................... H04L 9/14 |
| 2019/0140832 A1 * | 5/2019 | Leavy .................. H04L 9/3247 |

OTHER PUBLICATIONS

Kazuo Kayamoto et al., "Cloud-based Print Service to Support Work Style Innovation," Jul. 2018, pp. 24-31. (Year: 2018).*

* cited by examiner

SYSTEM AND METHOD FOR SECURING A CONTENT CREATION DEVICE CONNECTED TO A CLOUD SERVICE

SUMMARY

The present disclosure relates to securing a content creation device connected to a cloud service. In one embodiment, a certified application is installed onto a content creation device. The certified application establishes a first trust relationship with a cloud service. A mobile certified application is installed onto a mobile device, the mobile certified application establishing a second trust relationship with the cloud service. The mobile device is coupled to the content creation device via a proximity network to establish the third trust relationship via the certified application and mobile certified application. The mobile certified application generates a first ephemeral key pair having a private part that is private to the mobile device. The certified application generates second ephemeral key pair having a private part that is private to the content creation device. The mobile certified application requests a service from the content creation device. The service involves transfer of data between the content creation device and the cloud service. The data is protected by at least one of the first and second ephemeral key pairs in response to invocation of the service. The service results in at least one of the data being stored at the cloud service and being rendered at the content creation device.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to cloud services. Cloud services is a term used to describe Internet accessible computers that provide services such as data storage, web page hosting, communications, digital payment services, computational services, etc. Cloud services may be configured for use by organizations (e.g., governments, businesses), and/or individual users. Cloud services provide the convenience of instantly accessible data services via the Internet and also can provide enterprise-level security, reliability, and data loss prevention for end users.

Mobile devices have been able the usefully extend their capabilities via cloud. Mobile devices are commonly continuously Internet-connected, and so can readily take advantage of remote network services. For example, mobile devices may be used for generating data, e.g., via cameras and microphones, as well as storing incoming data, e.g., text and multimedia messages. Storage of large amounts of data can be expensive on mobile devices, as cost per unit of storage is typically much more on a mobile device than a desktop/laptop computer or cloud service. Also, mobile devices are more likely to be broken, lost, or stolen compared to a traditional computer, and this makes it risky to rely on a mobile device as a sole depository of important data.

Mobile devices commonly connect to cloud storage services to continually back up the data stored on the device. Mobile devices can use other types of cloud services, such as communications (e.g., email, text messaging) and computing. As an example of the latter, complex machine learning models (e.g., neural networks) used for image and speech recognition can be challenging to run on the limited computing facilities of a mobile device. As such, representations of the data can be sent over the network to a cloud machine learning model for classification or other processing, and the results sent back to the mobile device.

Cloud computing vendors often emphasize security of cloud services, which pertains to both the security of the communications (e.g., using network encryption and authentication) and the security of the stored data (e.g., storage encryption, intrusion detection, redundant copies and backups). Cloud services leverage point-to-point security protocols and data center security protocols such that users can trust the cloud services to store valuable or sensitive information.

One aspect of data security that is not always addressed in cloud services is the need to interact with other devices that are not under the direct control of the user or the cloud vendor. For example, a user may wish to scan or print documents using an Internet connected multifunction printer (MFP) or similar content creation device. The MFP is openly accessible, such that anybody with physical access is able to use the MFP, even though payment or a membership may be required. A scanned document may be transferred directly from the MFP to a cloud service for storage, and a printed document (or a printable translation such as a postscript file) may be downloaded directly from the cloud service to the MFP. These actions can be directed by the user's mobile device, which may optionally connect to the MFP via a proximity network (e.g., WiFi, Bluetooth). In other examples, the mobile device may store the print/scan file locally and/or send the data to the cloud service.

Generally, an openly accessible MFP or similar device may be considered a security risk in the above scenarios. For example, there may be no guarantee the MFP will not cache the file after it is done being stored on the cloud or printed. The user may also not have a way to ensure the MFP connects to the cloud service in a secure manner, e.g., using authentication certificates and encryption of network data. Yet there are many scenarios where a user may need to print out or scan documents on an openly accessible device, e.g., printing from a publicly accessible printer on a business trip.

Embodiments described herein include features that can help ensure that a user can use a printing and/or scanning device that can be assured to provide a minimum level of security. A content creation device, a mobile device, and a cloud service can establish a three-way trust relationship such that the user can ensure that the content creation device is enforcing some level of pre-defined level of security. The user can encrypt data via the mobile device such that even the cloud service cannot read the data if it is stored there. Alternatively, the file scanned at the MFP may be encrypted such that the cloud service cannot read the scanned file if it is stored there. This system can prevent data breaches and leak of users' personal identifiable information, financial information, protected health information, etc.

Figure 1:
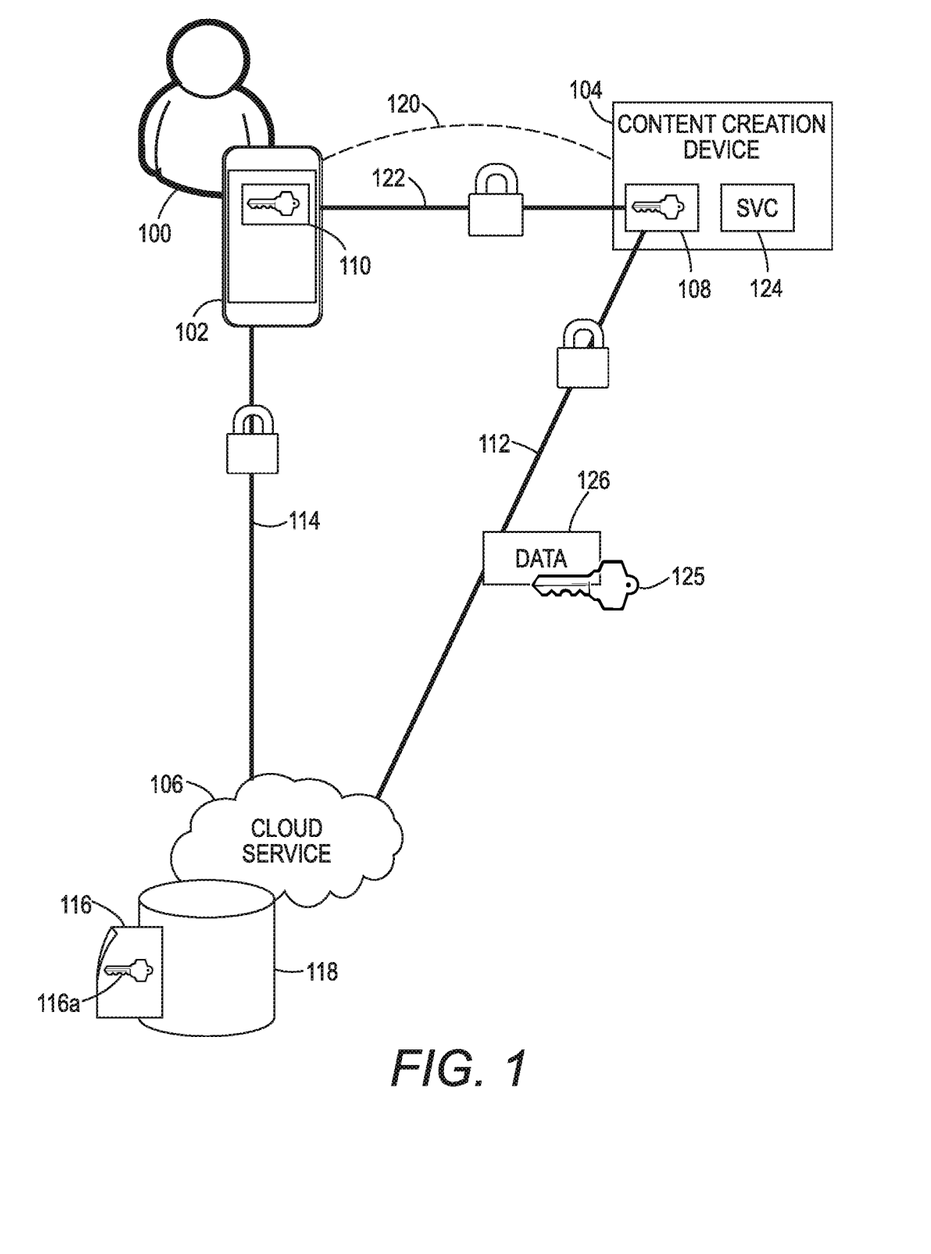
FIG. 1 is a block diagram of a system according to an example embodiment.

In FIG. 1, a block diagram illustrates a system according to an example embodiment. A user 100 uses a mobile device 102 that is capable of communicating locally (e.g., within line of sight, within the same building) with a content creation device 104 and remotely (e.g., via an Internet connection) to a cloud service 106. The mobile device 102 may include any portable computing device such as a smartphone, tablet, laptop, etc. The content creation device 104 may include any combination of printer, scanner, fax machine, or any other device that creates physical and/or digital content based on data that can be transmitted to or from the device 104 via a data link.

The entity that manages the cloud service 106 has the most direct control over the software and hardware used by the service 106, and therefore can ensure that enterprise best practices are implemented to ensure integrity and security. Therefore, the cloud service 106 is the most likely entity that can be trusted from a security and privacy standpoint. Therefore, the cloud service 106 provides certified applications 108, 110 that are installed onto the content creation device 104 and the mobile device 102. The applications 108, 110 may be executable code configured as any combination of user interactive programs, background services, trusted platform module (TPM) interfaces, etc.

The certified applications 108, 110 establish independent trust relationships 112, 114 with the cloud service. These relationships 112, 114 are used to enable trusted data communications, e.g., network connections, and the relationships 112, 114 may be associated with multiple, temporary connections. These relationships 112, 114 may include separate encryption and authentication to protect network connections. Connections can be protected using public/private key encryption of hypertext transport protocol connections (HTTPS), secure shell connections (SSH), etc.

The certified applications 108, 110 may also make use of separate and independent keys for encrypting the content within the connections used in the relationships 112, 114. For example, the user 100 may store a file 116 (e.g., document) on a data store 118 of the cloud service 106. The file 116 can be encrypted by a key 116a generated via the certified application 110 such that the file 116 is protected even if a connection between the user device 102 and the cloud service 106 is compromised. Further, the key 116a prevents the cloud service 106 from reading the file 116; only the particular trusted application 110 that created the key 116a can read the file 116, and the application 110 may generate multiple unique keys for each file it stores and/or transmits.

In the scenario shown in FIG. 1, the user 100 wishes to securely utilize the content creation device 104. Generally, the user 100 and mobile device 102 will be in close proximity with the content creation device 104, as this will generally involve the reproduction of a physical document, e.g., printing, scanning, faxing. The mobile device 102 is coupled to the content creation device via a proximity network 120, which may be established using Bluetooth, WiFi, infrared, USB, etc.

The proximity network 120 is used to establish a third trust relationship 122 via the first and second certified applications 108, 110. The particulars of the trust relationship 122 can be managed by the cloud service 106 such that both applications 108, 110 can rely on the trust relationship 122 as valid for at least a single transaction. The second certified application 110 generates an ephemeral encryption key 125 comprising a private part that is private to the mobile device 102, e.g., it is accessible only to the mobile device. The second certified application 110 of the mobile device requests a service 124 from the content creation device 104. The service 124 involves transfer of data 126 between the content creation device 104 and the cloud service 106, the data being protected by the ephemeral encryption key 125 in response to invocation of the service 124. The service results in at least one of the data 126 being stored at the cloud service 106 and being rendered at the content creation device 104.

In one embodiment, the user 100 wants to scan a document on the content creation device 104 and store it on the cloud service 106. The cloud service allows the user 100 to scan documents on any content creation device supporting the service anywhere in the world within a period of time. Generally, such supported content creation device will have a secure application or other functionality similar to certified application 108. The user's mobile device 102 establishes the trust relationship 122 over the proximity network 120, which can be authenticated locally and/or via the cloud service 106. The data 126 is scanned at the content creation device 104 and encrypted via the ephemeral key 125. The encryption may occur on the mobile device 102 or the content creation device 104, and the encrypted data 126 is stored on the cloud service 106, either directly from the content creation device 104 via the Internet or via the mobile device 102. For the data 126 to be encrypted by the mobile device, the data 126 can be sent by application 108 to application 110 via network 120 using the trust relationship 122 to secure the transmission. The content creation device 104 will have hardware trust features (e.g., TPM) to ensure that any unencrypted data is deleted, scrambled, or otherwise destroyed after completion of the scanning service 124.

A similar scenario may facilitate printing a document. After the trust relationship 122 is established over the proximity network 120, the data 126 is transferred from the cloud service 106 to the content creation device 104, either directly via the Internet or via mobile device 102. The mobile device 102 facilitates decrypting the data via through use of the ephemeral key 125. The decryption may occur on the mobile device 102 or the content creation device 104, and the content creation device 104 prints the data 126. For the file to be decrypted by the mobile device 102, the data 126 can be sent by application 106 to application 110 using the trust relationship 114 to secure the transmission. After decryption of the file in the mobile device, this is sent from 110 to 108 via network 120 using the trust relationship 122 to secure the transmission. The content creation device 104 will then remove any unencrypted data as with the scanning example.

Generally, the system host users' data in the cloud servers and the data content is hidden from the cloud service 106 during communications and storage. The security properties include the user secret key 125, at least a private part of which is only located in user's mobile device 102. Documents to be stored are encrypted with user secret key 125. The document 126 is securely erased after a given period of time from the content creation device 104. For example, the National Institute of Standards and Technology (NIST) has guidelines for sanitizing media. The document 116 is secure at rest, during transmission, and during processing up to a point of piping it for scanning or printing. The cloud service 106 may be considered as semi-honest. The content creation device 104 is trusted if the mobile application 110 can verify this via a certificate (or a public signing key). The mobile application 110 is trusted if the cloud service 106 can verify this via a certificate (or a public signing key). For purposes of this threat model, it is assumed that the mobile device 102 is not compromised, e.g., it is not in possession or control of an adversary and the adversary has not compromised the lock screen (e.g., via a compromised PIN or biometric).

Figure 2:
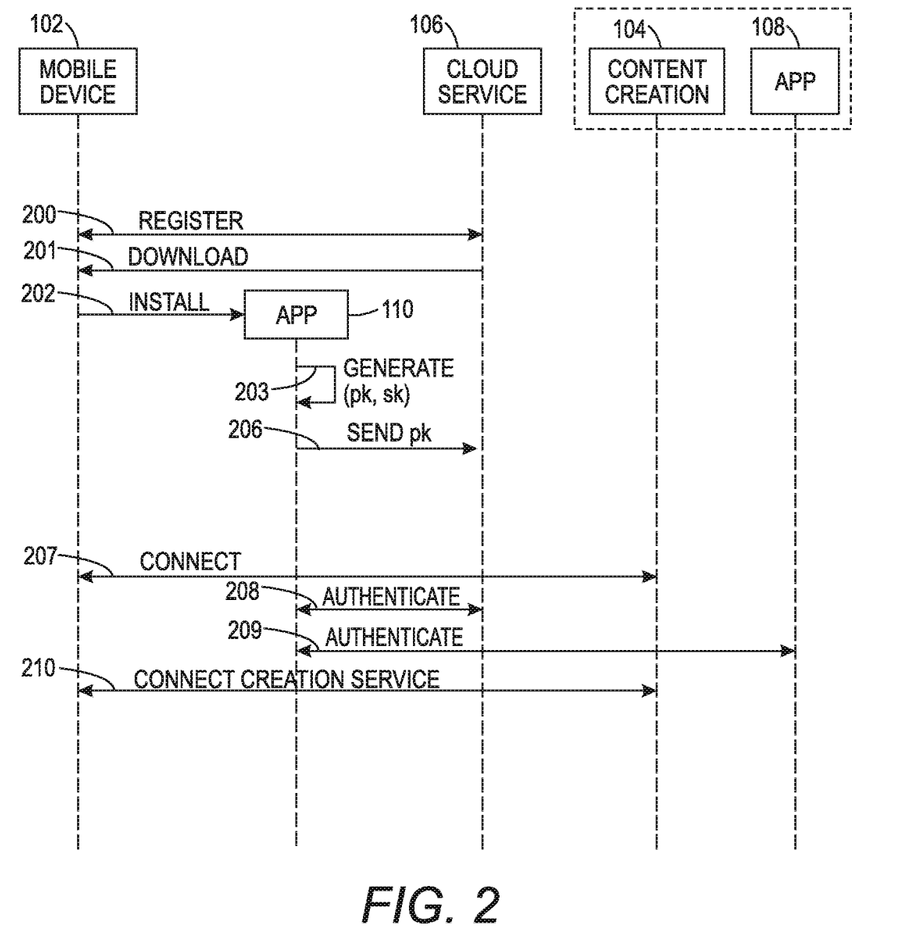
FIG. 2 is a sequence diagram illustrating authentication of system components according to an example embodiment.

In FIG. 2, a sequence diagram shows protocol steps used by a system according to an example embodiment. Using the mobile device 102, the user registers 200 with the cloud service 106 and downloads 201 the certified mobile application 110 from the cloud service 106. The application 110 is installed 202 on the mobile device. Upon initialization, the application 110 generates 203 a key-pair (pk, sk) and sends 204 the public key (pk) to the cloud service 106 where it is made available for user signing, authentication, and authorization purposes. The application 110 may send other data, such as data confirming the authenticity of the application 110.

After the public key is sent 206, a trust relationship is established between the mobile device 102 and cloud service 106. Thereafter, the mobile device 102 is moved into proximity with the content creation device 104 where they may connect 207, e.g., using Bluetooth Low Energy (BLE). If BLE is available, the mobile device 102 and the content creation device 104 establish a trust relationship over BLE and exchange security information, including each other's public encryption keys. To establish the trust relationship, the application 110 of the mobile device 102 authenticates 208 with the cloud service 106 and obtains a security token from the cloud service. The mobile device then uses the security token to authenticate 209 over BLE with the application 108 of the content creation device.

As part of the first authentication 208, the mobile device 102 may receive security information of the content creation device 104 from the cloud service 106, such as a public key generated by the content creation application 108 when it first registered with the cloud service 106. The two devices may also establish ephemeral (symmetric or asymmetric) encryption keys to be used in the subsequent service protocols. Symmetric encryption keys may be generated using the well-known AES-256 algorithm. Asymmetric encryption keys (i.e., public keys) may be generated by the well-known RSA algorithm or the newer elliptic curve-based algorithms. After authentication 209, the mobile device 102 and content creation device 104 can engage in a service as described elsewhere herein. In an alternative embodiment, when BLE is not available, the establishment of the trust relationship between the mobile application 110 and the content creation device 104 can be mediated by the cloud service. Concretely, the cloud service serves as a bulletin board which takes the place of the BLE channel. On this bulletin board, the mobile device and content creation device each write public information, which nevertheless allows them to exchange security keys, using protocols like Diffie Hellman Key Exchange, as taught by "Diffie, W. and Hellman, M., 1976. New directions in cryptography. *IEEE transactions on Information Theory*, 22(6), pp. 644-654.

Figure 3:
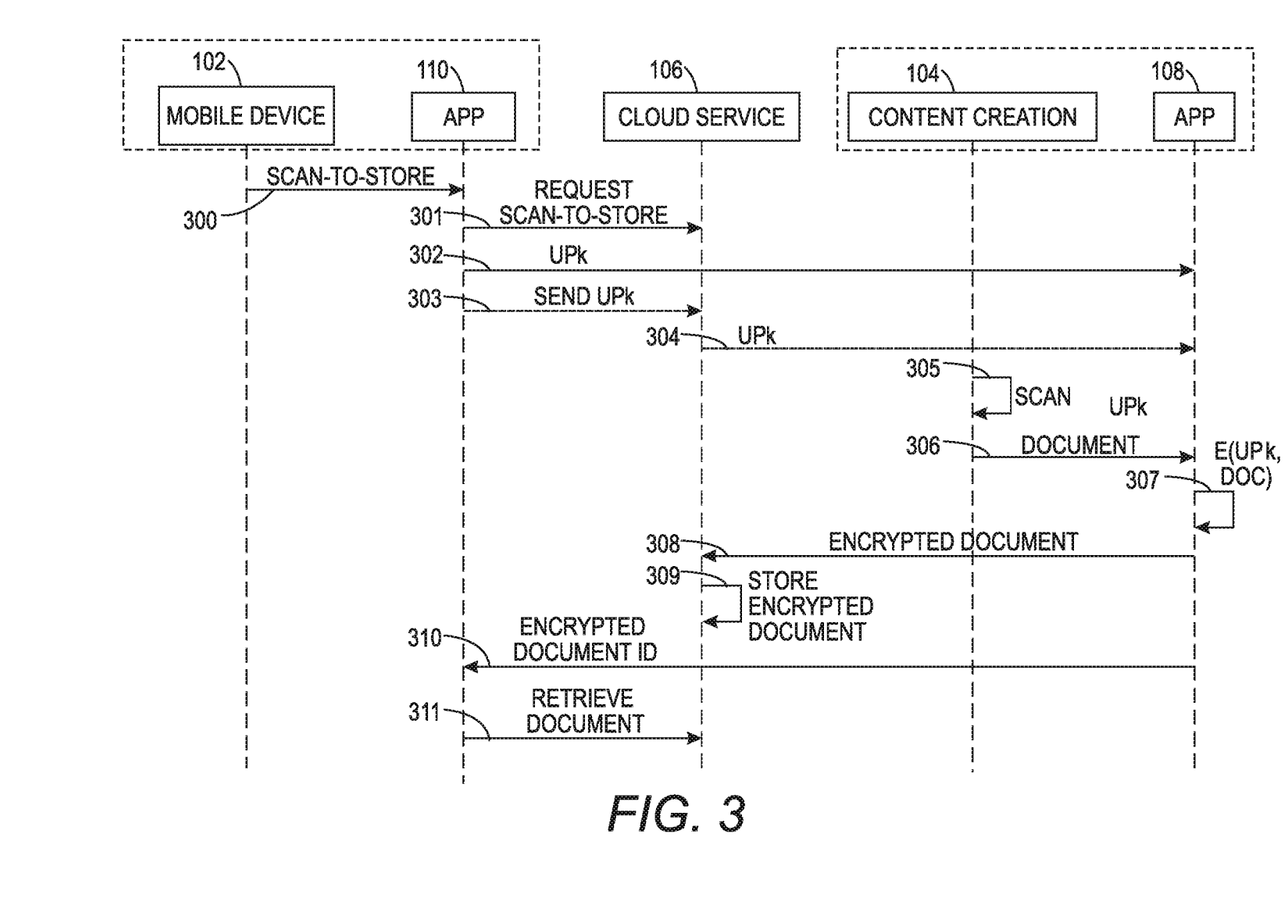
FIG. 3 is a sequence diagram illustrating a scanning operation according to an example embodiment.

In FIG. 3, a sequence diagram showing how a scanning service may be performed in a system according to an example embodiment. The mobile device 102 uses the certified application 110 to request 300, 301 a service from the cloud service 106. In this example, the service is a scan-to-store service which scans and digitizes a document and stores it on the cloud service 106. The certified mobile application 110 provides 302 the user's public key (UPk) to the content creation device 104 via a proximity network channel. The public key UPk is an ephemeral key that is refreshed for each document being processed. Alternatively, the certified mobile application 110 can request 303 that the cloud service 106 delivers 304 the UPk to the certified application 108 on the content creation device.

The user scans 305 the document and the content creation device 104 pipes 306 it from memory to be encrypted 307 under the user's public key UPk, E(UPk, document). The certified application 108 sends 308 the encrypted document over a secure channel to the cloud service 106. This secure channel is established in the standard way using protocols such as TLS (Transport Layer Security). The cloud service 106 stores 309 the encrypted document under the user's allocated storage (e.g., dead drop). The content creation device's certified application 108 sends to user's certified application 110 a document id, ID(E(UPk, document)), for future fast retrieval 311 of the document from the cloud service. This last transmission can take place over BLE (if available) or via the cloud service.

Figure 4:
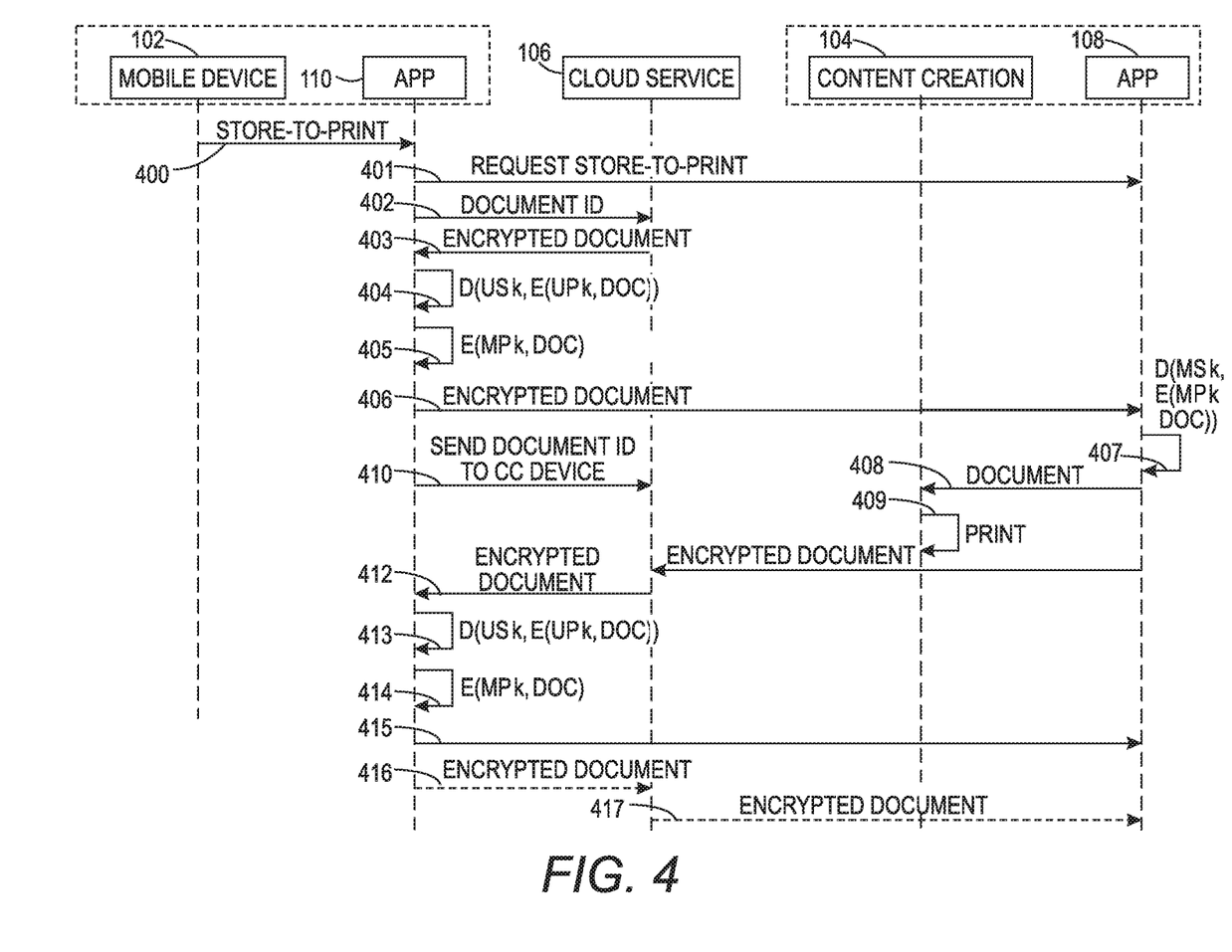
FIG. 4 is a sequence diagram illustrating a printing operation according to an example embodiment.

In FIG. 4, a sequence diagram shows how a printing service may be performed in a system according to an example embodiment. The mobile device 102 uses the certified application 110 to request 400, 401 a service from the certified application 108 in the content creation device 104. In this example, the service is a store-to-print service which sends a document stored at the cloud service 106 to the content creation device 104 for printing. The user's certified application 110 provides 402 a document ID selected by the user to the cloud service 106, which provides 403 the document to the application 110.

The user's certified application 110 decrypts 404 the document using its private key USk, D(USk, E(UPk, document)), and encrypts 405 it with the content creation device 104 public key MPk, E(MPk, document). The certified application 110 sends 406 the encrypted E(MPk, document) to the certified application 108 of the content creation device 104 via the proximity network. The certified application 108 decrypts 407 D(MSk, E(MPk, document)) and pipes 408 it for printing 409.

Also shown in FIG. 4 are alternate interactions that may be used to achieve the printing operation when the user's mobile device 102 does not have high-throughput network connectivity to the cloud service 106. After requesting the print service, the user's certified application 110 requests 410 the cloud service 106 to send the encrypted document 412 indexed by a particular document ID to the certified application 108 in the content creation device 104 to be relayed to the user's certified application 110 via the proximity network. This document is E(UPk, document). As with the previous example, the application 110 decrypts 413 the document D(USk, E(UPk, document)) and encrypts 414 it again with the content creation device 104 public key MPk, E(MPk, document). The certified application 110 sends 415 the encrypted E(MPk, document) to the certified application 108 of the content creation device 104 via the proximity network, which then decrypts and prints as shown above in operations 407-409. As an alternate, after operations 400-405 instead of directly sending 415 the encrypted document via the proximity network, it can be sent 416, 417 via the cloud service 106.

Generally, the content creation device 104 and cloud service 106 may be configured to securely erase copies of document after an expiration time has completed. For example, if the cloud service sends 417 the document encrypted with the content creation device key MPk, then this document could be marked for deletion after a particular period of time, and sooner if provided an acknowledgement of successful printing from the application 108. Similarly, the content creation device 104 would have similar precautions for both encrypted and decrypted versions of the latter, including no storage of decrypted versions in non-volatile storage if the content creation device 104 is so equipped.

Figure 5:
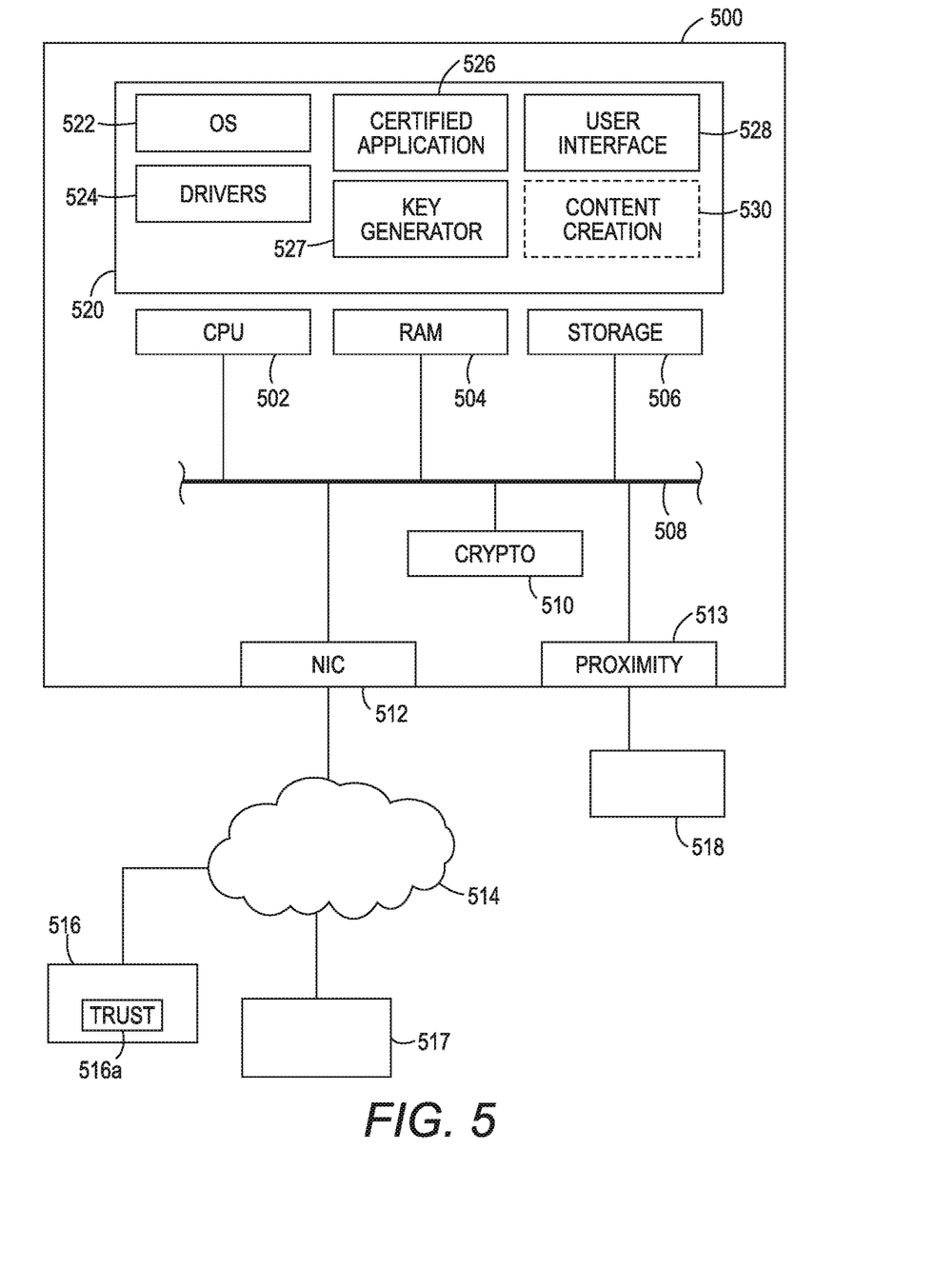
FIG. 5 is a block diagram of a device according to an example embodiment.

The systems described herein can be implemented using conventional or custom processing hardware, e.g., personal computers, servers, routers, gateways, embedded devices, application-specific integrated circuits, mobile devices, etc. In FIG. 5, a block diagram shows a device 500 according to an example embodiment, which may be a mobile device, or a content creation device as described above. The device 500 includes one or more processors 502 such as a central processing unit, co-processor, digital signal processor, etc. The processor 502 is coupled to memory, which may include both random access memory 504 and persistent storage 506, via one or more input/output busses 508. Other general-purpose or special-purpose hardware may be coupled to the bus 508, such as cryptographic module 510, network interface 512, and proximity network interface 513. If the device 500 is a content creation device, it may also include content creation hardware 530, such as print heads, drums, rollers, optical scanner sensors, scanner carriage, document feeders, etc.

The network interface 512 facilitates communications via a network 514 with other Internet computing nodes 516, 517. These computing nodes 516, 517 may include servers of a cloud service as described above. At least one of the servers 516, 517 include a trust module 516a, that provides certified applications to the device 500 and other device to which the device 500 communications via proximity network. The trust module 516a can also validate the authenticity of running certified applications, which facilitates establishing peer trust relationships between individual pairs of certified applications. The network 514 may include a combination of local area links and wide area communications backbones. The proximity network interface 513 facilitates communications with another device (e.g., mobile device or content creation device) that is in proximity, e.g., within wireless communication range.

The device 500 includes software 520 that facilitates communications, authentication, and content creation services as described herein. The software 520 includes an operating system 522 and drivers 524 that facilitate communications between user level programs and the hardware, as well as managing at least some layers of the network communications protocols. The software 520 may include specialized software components, such as a key generator 527 used to generate ephemeral keys.

A user interface 528 can facilitate management and utilization of services. If the device 500 is a mobile device, the user interface 528 can include elements that allow viewing stored files, entering passwords and/or biometrics, initiating connections via proximity networks, selecting and starting services with content creation devices, etc. If the device 500 is a content creation device, the user interface may allow installation and update of certified applications, querying job status and history, etc.

Figure 6:
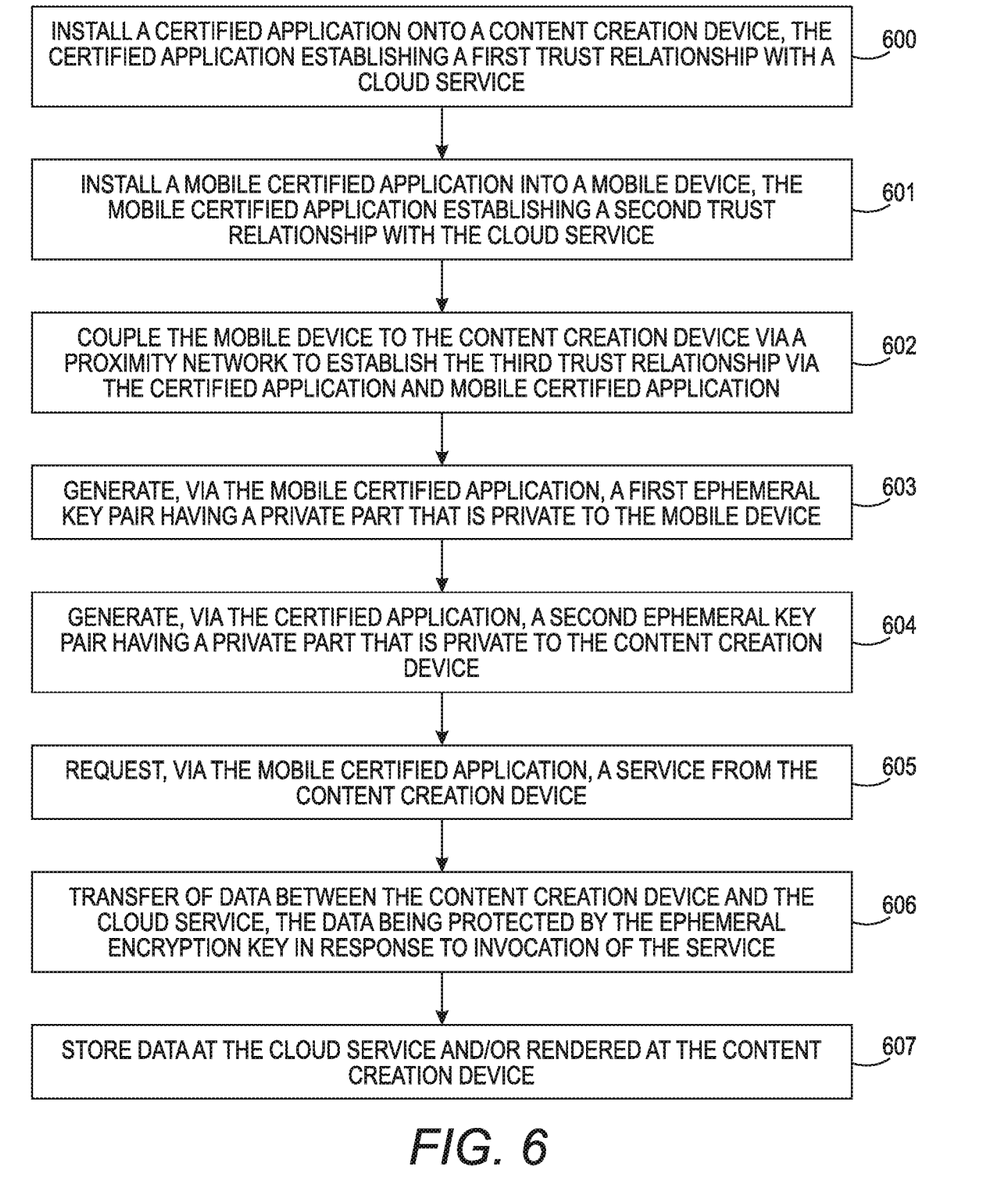
FIG. 6 is a flowchart of a method according to an example embodiment.

In FIG. 6, a flowchart shows a method according to another example embodiment. The method involves installing 600 a certified application onto a content creation device. The certified application establishes a first trust relationship with a cloud service. A mobile certified application is installed 601 onto a mobile device, the mobile certified application establishing a second trust relationship with the cloud service. The mobile device is coupled 602 to the content creation device via a proximity network to establish the third trust relationship via the certified application and mobile certified application. The mobile certified application generates 603 a first ephemeral key pair having a private part that is private to the mobile device. The certified application generates 604 second ephemeral key pair having a private part that is private to the content creation device.

The mobile certified application requests 605 a service from the content creation device. The service involves transfer 606 of data between the content creation device and the cloud service. The data is protected by one of the first and second ephemeral key pairs in response to invocation of the service, e.g., depending on which direction of secured content communication is involved in the service, such as printing versus scanning. The service results 607 in at least one of the data being stored at the cloud service and being rendered at the content creation device.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A method comprising:
    installing a certified application onto a content creation device from a cloud service, the certified application establishing a first trust relationship with the cloud service, wherein the content creation device comprises a multifunction printer;
    installing a mobile certified application onto a mobile device from the cloud service, the mobile certified application establishing a second trust relationship with the cloud service;
    coupling the mobile device to the content creation device via a proximity network to establish a third trust relationship via the certified application and mobile certified application, particulars of the third trust relationship being managed by the cloud service wherein the certified application and the mobile certified application can rely on the third trust relationship as being valid for at least a single transaction;
    generating, via the mobile certified application, a first ephemeral key pair having a private part that is private to the mobile device;
    generating, via the certified application, a second ephemeral key pair having a private part that is private to the content creation device; and
    requesting, via the mobile certified application, a service from the content creation device, the service involving transfer of data of a document between the content creation device and the cloud service or transfer of the data of the document between the mobile device and the content creation device, the data being protected by at least one of the first and second ephemeral key pairs in response to invocation of the service, wherein protecting the document involves performing one of: sending a public part of the first ephemeral key pair to the content creation device; or sending a public part of the second ephemeral key pair to the mobile device.

2. The method of claim 1, wherein the service comprises scanning of the document by the content creation device and the data comprises a digital file of the scanned document, the protecting of the digital file comprising encrypting the digital file using the public part of the first ephemeral key pair before storing the encrypted digital file at the cloud service via the first trust relationship.

3. The method of claim 2, wherein the public part of the first ephemeral key pair is sent from the mobile certified application to the certified application of the content creation device.

4. The method of claim 2, wherein the public part of the first ephemeral key pair is sent from the cloud service to the certified application of the content creation device at the request of the mobile certified application.

5. The method of claim 1, wherein the data comprises an encrypted file stored on the cloud service that is encrypted with the first ephemeral key pair, the service comprising:
transferring the encrypted file from the cloud service to the mobile device;
decrypting the encrypted file at the mobile device using the first ephemeral key pair to obtain a digital copy of the document;
encrypting the digital copy of the document using the public part of the second ephemeral key pair received from the content creation device to create a second encrypted file;
decrypting the second encrypted file at the content creation device; and
printing the decrypted digital copy of the document at the content creation device.

6. The method of claim 5, wherein the public part of the second ephemeral key pair is sent from the certified application on the content creation device to the mobile certified application.

7. The method of claim 5, wherein the encrypted file is transferred from the cloud service to the mobile device via the content creation device.

8. The method of claim 1, wherein the proximity network comprises a Bluetooth connection.

9. A system comprising:
a cloud service configured to provide a data storage service and first and second certified applications, the cloud service operable to establish a peer trust relationship between the first and second certified applications;
a content creation device onto which the first certified application is installed, the content creation device comprising a multifunction printer that is network-coupled to the cloud service via a first trust relationship;
a mobile device onto which the second certified application is installed, the mobile device being network-coupled to the cloud service via second trust relationship and locally network coupled to the content creation device using the peer trust relationship, particulars of the peer trust relationship being managed by the cloud service wherein the first certified application and the second certified application can rely on the peer trust relationship as being valid for at least a single transaction, the mobile device configured via the second certified application to:
generate a first ephemeral key pair comprising a private part that is private to the mobile device; and
request a service from the content creation device using the peer trust relationship, the service involving transfer of data of a document between the content creation device and the cloud service or transfer of the data between the mobile device and the content creation device, the data being protected by at least one of the first ephemeral key pair and a second ephemeral key pair of the content creation device in response to invocation of the service, the second ephemeral key pair having a private part that is private to the content creation device, wherein protecting the document involves performing one of: sending a public part of the first ephemeral key pair to the content creation device; or sending a public part of the second ephemeral key pair to the mobile device.

10. The system of claim 9, wherein the service comprises scanning of the document by the content creation device and the data comprises a digital file of the scanned document, the protecting of the digital file comprising encrypting the digital file using the public part of the first ephemeral key pair before storing the encrypted digital file at the cloud service via the first trust relationship.

11. The system of claim 10, wherein the public part of the first ephemeral key pair is sent from the mobile certified application to the certified application of the content creation device.

12. The system of claim 10, wherein the public part of the first ephemeral key pair is sent from the cloud service to the certified application of the content creation device at the request of the mobile certified application.

13. The system of claim 9, wherein the data comprises an encrypted file stored on the cloud service that is encrypted with the first ephemeral key pair, the service comprising:
transferring the encrypted file from the cloud service to the mobile device;
decrypting the encrypted file at the mobile device using the first ephemeral key pair to obtain a digital copy of a document;
encrypting the digital copy of the document using the public part of the second ephemeral key pair received from the content creation device to create a second encrypted file;
decrypting the second encrypted file at the content creation device; and
printing the decrypted digital copy of the document at the content creation device.

14. The system of claim 13, wherein the public part of the second ephemeral key pair is sent from the certified application on the content creation device to the mobile certified application.

15. The system of claim 13, wherein the encrypted file is transferred from the cloud service to the mobile device via the content creation device.

16. The system of claim 9, wherein the mobile device is coupled to the content creation device via a Bluetooth connection.

17. A system comprising:
a cloud service configured to provide a data storage service and first and second certified applications, the cloud service operable to establish a peer trust relationship between the first and second certified applications;

a content creation device onto which the first certified application is installed, the content creation device comprising a multifunction printer that is network-coupled to the cloud service via a first trust relationship;

a mobile device onto which the second certified application is installed, the second certified application generating a mobile ephemeral key pair, the mobile device being network-coupled to the cloud service via second trust relationship and locally network coupled to the content creation device using the peer trust relationship, particulars of the peer trust relationship being managed by the cloud service wherein the first certified application and the second certified application can rely on the peer trust relationship as being valid for at least a single transaction, the content creation device configured via the first certified application to:

generate an ephemeral key pair comprising a private part that is private to the content creation device; and service a request from the mobile device using the peer trust relationship, the service involving transfer of data of a document between the content creation device and the cloud service or transfer of the data between the mobile device and the content creation device, the data being protected by at least one of the ephemeral key pair and the mobile ephemeral key pair in response to invocation of the service, wherein protecting the document involves performing one of: sending a public part of the mobile ephemeral key pair to the content creation device; or sending a public part of the ephemeral key pair to the mobile device.

18. The system of claim 17, wherein the service comprises scanning of the document and the data comprises a digital file of the scanned document, the protecting of the digital file comprising encrypting the digital file using the public part of the mobile ephemeral key pair generated by the second certified application before storing the encrypted digital file at the cloud service via the first trust relationship.

19. The system of claim 18, wherein the public part of the mobile ephemeral key pair is sent from the second certified application to the first certified application of the content creation device.

20. The system of claim 18, wherein the public part of the mobile ephemeral key pair is sent from the cloud service to the first certified application of the content creation device at the request of the second certified application of the mobile device.

21. The system of claim 17, wherein the data comprises an encrypted file stored on the cloud service that is encrypted with the mobile ephemeral key pair generated by the second certified application, the service comprising:

transferring the encrypted file from the cloud service to the mobile device;

decrypting the encrypted file at the mobile device using the mobile ephemeral key pair to obtain a digital copy of the document;

encrypting the digital copy of the document using the public part of the ephemeral key pair received from the content creation device to create a second encrypted file;

decrypting the second encrypted file at the content creation device; and printing the decrypted digital copy of the document at the content creation device.

* * * * *